VAPOR GENERATOR

Filed Oct. 8, 1954 11 Sheets-Sheet 1

INVENTORS
MARTIN FRISCH
JOHN W. CARTINHOUR
WILLIAM TINBERGEN
TOBIAS STERN
GEORGE W. TIDD
BY C. R. Miranda
ATTORNEY INVENTORS
MARTIN FRISCH
JOHN W. CARTINHOUR
WILLIAM TINBERGEN
TOBIAS STERN
GEORGE W. TIDD BY C. M. Miranda
ATTORNEY July 12, 1960 M. FRISCH ET AL 2,944,532

VAPOR GENERATOR

Filed Oct. 8, 1954 11 Sheets-Sheet 3

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 4

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 5

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 6

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 7

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 8

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 9

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 10

INVENTORS
MARTIN FRISCH
JOHN W. CARTINHOUR
WILLIAM TINBERGEN
TOBIAS STERN
GEORGE W. TIDD

BY C. R. Miranda
ATTORNEY

July 12, 1960 M. FRISCH ET AL 2,944,532

VAPOR GENERATOR

Filed Oct. 8, 1954 11 Sheets-Sheet 11

INVENTORS
MARTIN FRISCH
JOHN W. CARTINHOUR
WILLIAM TINBERGEN
TOBIAS STERN
GEORGE W. TIDD

BY C. R. Miranda
ATTORNEY

United States Patent Office 2,944,532 Patented July 12, 1960

2,944,532

VAPOR GENERATOR

Martin Frisch, New York, and John W. Cartinhour, Baldwin, N. Y., William Tinbergen, North Bergen, N.J., and Tobias Stern, Brooklyn, and George W. Tidd, Manhasset, N.Y., assignors to Foster Wheeler Corporation, New York, N.Y., a corporation of New York Filed Oct. 8, 1954, Ser. No. 461,194

17 Claims. (Cl. 122—235)

This invention relates to vapor generators.

The present invention contemplates a novel vapor generator of simple and compact construction and one which provides for low maintenance costs and effective operation.

In accordance with the present invention a pressure fired vapor generator is provided with a substantially cylindrical shaped combustion chamber defined by a plurality of peripherally arranged vapor generating tubes. A plurality of rows of fluid conducting tubes are arranged outside the combustion chamber and concentric with the vapor generating tubes but in heat exchange relationship with the combustion gases flowing from the combustion chamber. The concentric rows of tubes are arranged in a manner to obtain maximum heating surface of the tubes.

The features and advantages which characterize the present invention will appear more fully hereinafter from a consideration of the detailed description which follows, taken together with the accompanying drawings wherein several embodiments of the invention are illustrated by way of example.

Like characters of reference refer to the same parts throughout the several views.

Figure 1:
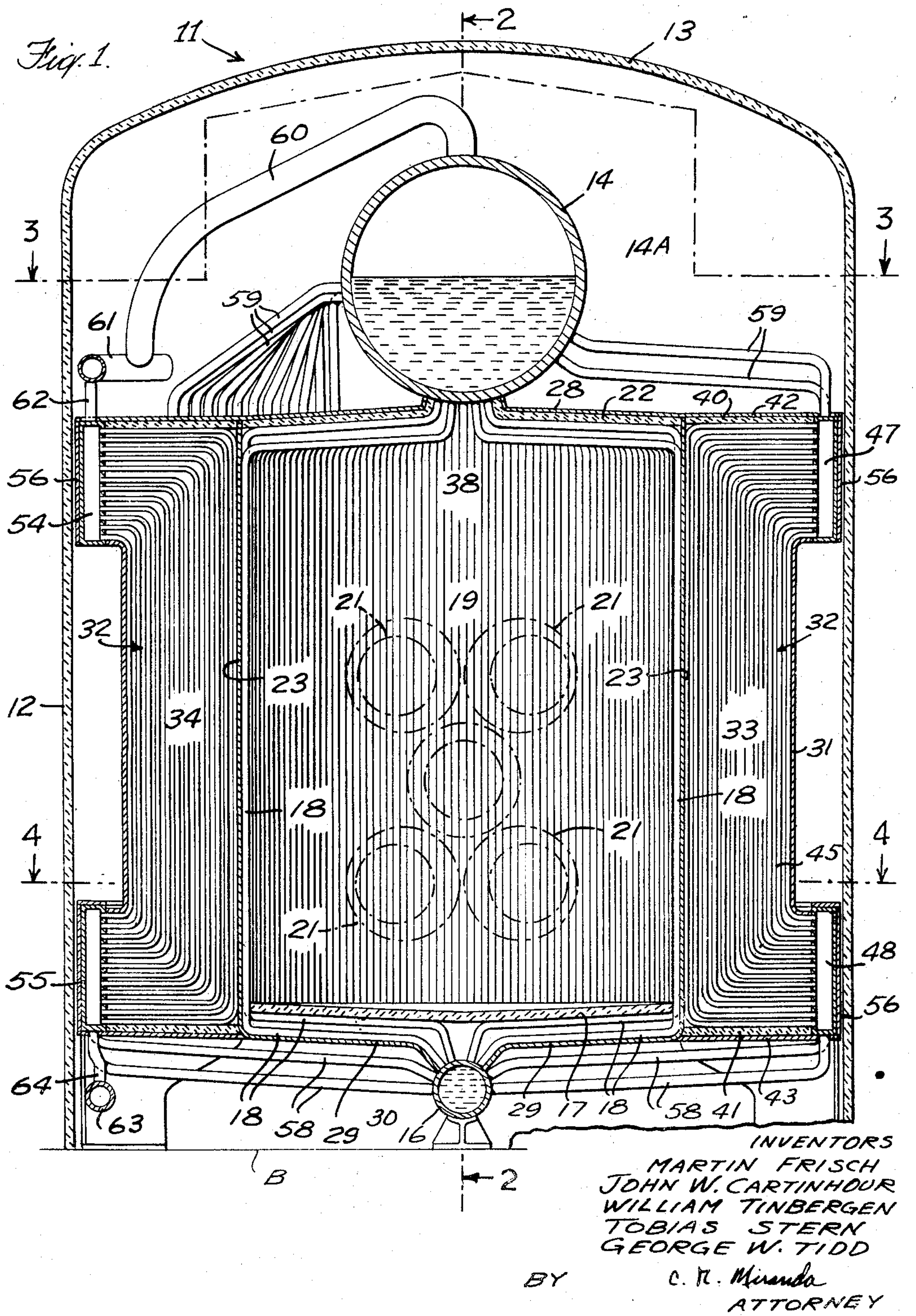
Fig. 1 is a sectional view, in elevation, of a vapor generator constituting one embodiment of the present invention and taken on the line 1—1 of Fig. 4.
Figure 2:
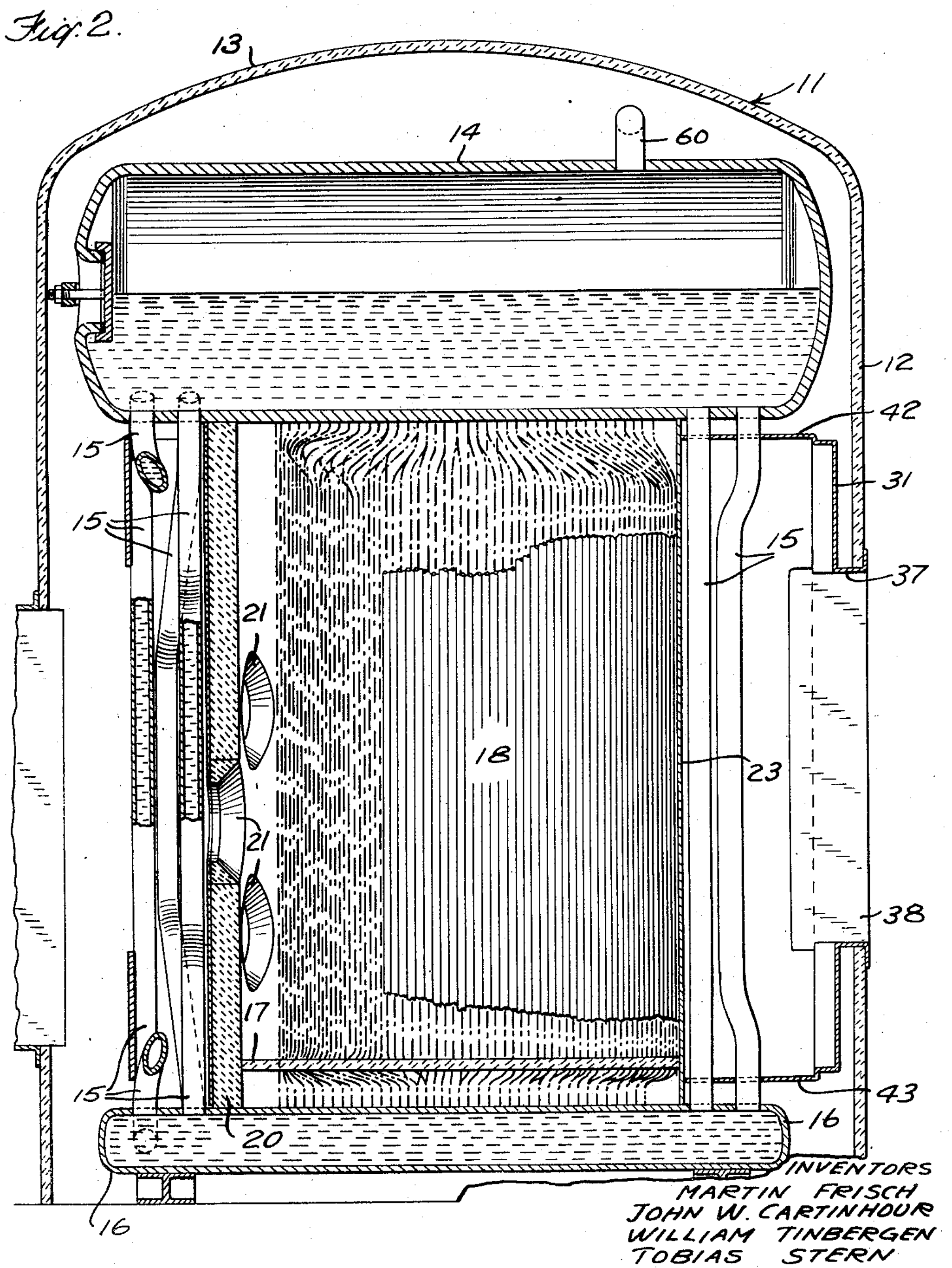
Fig. 2 is a sectional view, in elevation, taken on the line 2—2 of Fig. 1.

Referring now to the drawings for a more detailed description of the present invention and more particularly to Fig. 1 thereof wherein one embodiment of the present invention is shown, a vapor generator, generally designated by the numeral 11, comprises a vertically disposed cylindrical metal casing 12 having a top portion 13 spun into a dished or ellipsoidal shape permitting positive pressurizing of the generator and providing a casing capable of withstanding high pressure without reinforcement. Casing 12 is mounted on a base B and has a horizontal steam and water drum 14 disposed in an air space 14A in the upper portion of the casing. A plurality of vertically extending downcomer conduits or tubes 15 (Figs. 2 and 4) are arranged in the front and rear of the vapor generator 11 and communicate drum 14 with a water supply header 16 disposed at the bottom of casing 12, which header 16 extends parallel to drum 14.

Figure 4:
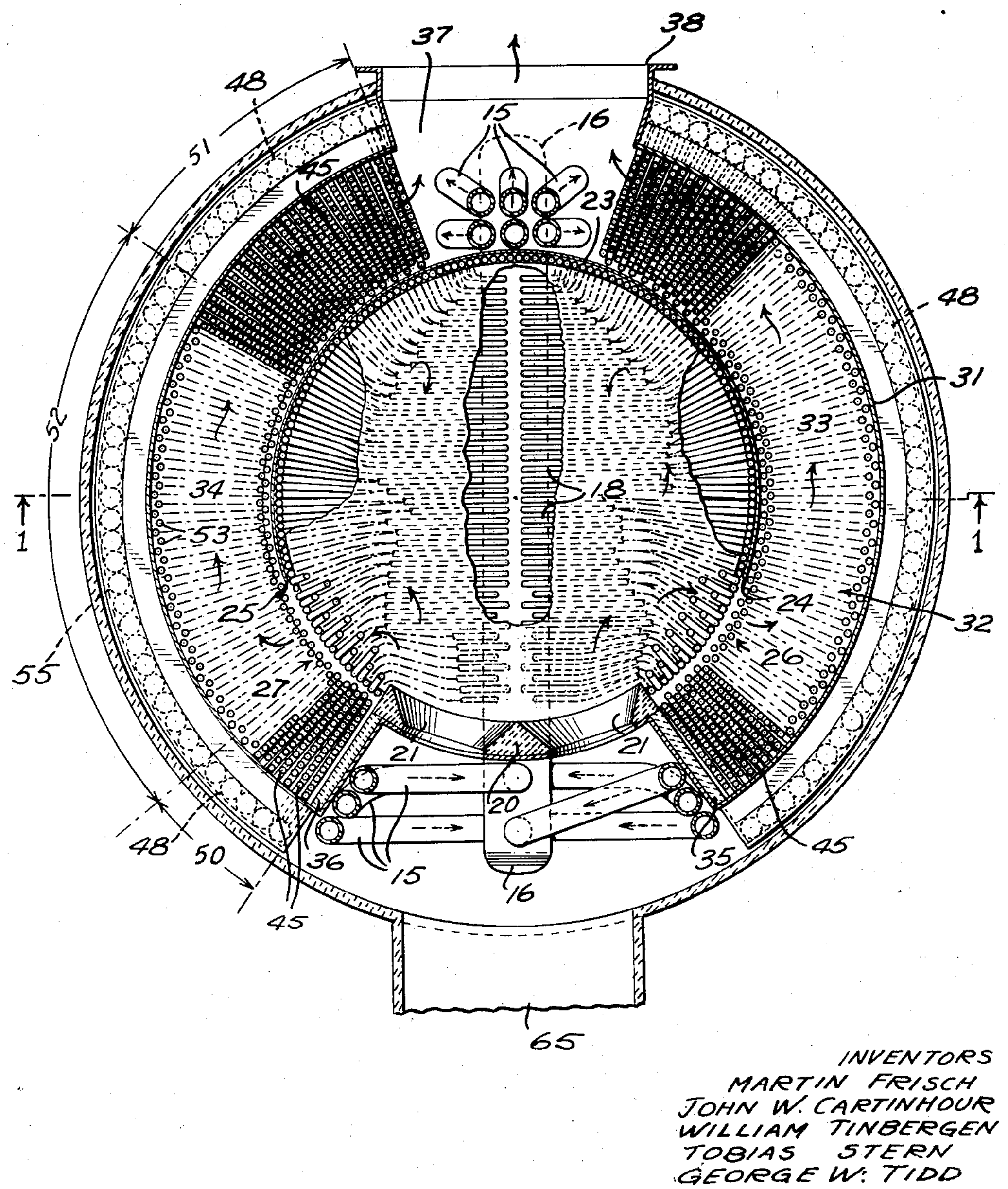
Fig. 4 is a transverse sectional view taken on the line 4—4 of Fig. 1.

A circular sheet 17 of refractory material (Fig. 1) is arranged above and in spaced relationship with the header 16. A plurality of tubes 18 are connected to the upper portion of header 16 at spaced longitudinal points (Fig. 4) and extend upwardly a short distance in a space between sheet 17 and header 16. The tubes are bent above header 16 to run substantially parallel to the sheet and said parallel portions terminate at points immediately adjacent the periphery of the sheet where they are bent upwardly approximately at right angles to the sheet. As shown in Fig. 4, the parallel arranged portion of tubes 18 are disposed perpendicular to header 16 for a distance and then extend radially to the periphery of sheet 17 where the tubes are formed at right angles to the sheet so as to form a circular arrangement of tubes at said periphery concentric with the sheet. The tubes 18 contact each other at the periphery of the sheet and extend vertically above the sheet to substantially define a combustion chamber 19, the remaining portion of the combustion chamber being defined by a vertical and arcuate-shaped front wall 20 of refractory material having burner openings 21 for accommodating burners (not shown).

The tubes 18 at the periphery of combustion chamber 19 extend upwardly to an upper circular refractory sheet 22 where the tubes are again bent to run parallel to and below the sheet. Upper sheet 22 is arranged parallel to lower sheet 17, which lower sheet may now be seen serving as the floor of combustion chamber 19 and sheet 22 has a longitudinally extending opening or slot therein through which tubes 18 project. The portions of tubes 18 projecting through the opening in sheet 22 are connected to drum 14 to thereby communicate header 16 with the drum. Tubes 18 will be hereinafter designated as vapor generating or furnace tubes. A curved metallic partition or wall 23 is disposed on the side of tubes 18 away from the center of the combustion chamber 19 (Fig. 4) and has vertical edges 24 and 25 spaced from the arcuate front wall 20. Alternate tubes 18, in the space between the partition edges 24 and 25 and the wall 20, are bent along their vertical portions toward the center of the combustion chamber to form furnace gas outlets 26 and 27 to thereby provide for discharge of combustion gases from the combustion chamber through the spaces formed by the displaced tubes 18. A lining 28 is provided for upper refractory sheet 22, and a lower baffle 29 is arranged below and spaced from refractory sheet 17. Lower baffle 29 has a longitudinal opening, the edges of which engage the upper portion of header 16 to seal the combustion chamber from an air space 30 in which the lower portion of header 16 is located. From the foregoing, it may be seen that the combustion chamber is maintained fluid-tight except for the furnace gas outlets 26 and 27.

A circular metallic partition or wall 31 is arranged between partition 23 and casing 12 and concentric therewith to define an annular gas passage 32. Gas passage 32 comprises an arcuate section 33 to the right of header 16 and an arcuate section 34 to the left of the header (Fig. 4). A radially extending wall 35 is provided in engagement with the front wall 20 adjacent furnace gas outlet 26 to seal the front end of the arcuate section 33 and a similar wall 36 is provided in engagement with the other end of the front wall adjacent gasoutlet 27, to seal the corresponding end of arcuate section 34. An opening 37 is formed in partition 31 to the rear of arcuate sections 33 and 34 (Figs. 2 and 4) and communicates with a combustion gas outlet 38 in the the rear of vapor generator 11. The top and bottom, respectively, of gas passage 32 are closed off by upper and lower annular refractory rings 40 41, the latter having metallic linings 42 and 43, respectively.

Radial groups of vertical vapor generating tubes or boiler tubes 45 are arranged in arcuate section 33 of gas passage 32 (Fig. 44) and the tubes extend from the partition 23 to partition 31. The upper and lower portions of tubes 45 are bent normal to the vertical or intermediate portions (Fig. 1) and are connected to upper and lower upright cylindrical headers 47 and 48, respectively, arranged concentric with combustion chamber 19, and circumferentially of casing 12. As shown in Fig. 4, the arrangement of the radial groups of tubes 45 presents arcuate rows of tubes concentric with combustion chamber 19 and furnace tubes 17, and extend from wall 35 counterclockwise to the opening 37 in partition 31. Similarly formed and arranged boiler tubes 45 are also disposed in arcuate section 34 but do not fill the entire section. One bank 50 (Fig. 4) of tubes 45 is arranged adjacent the furnace gas outlet 27 and a second bank 51 of tubes 45 is spaced from group 50 and located toward the rear of arcuate section 34. The upper and lower portions of tubes 45 of banks 50 and 51 are connected to upper and lower upright cylindrical headers similar to those in arcuate section 33 and which, for purposes of clarity and uniformity, are designated by identical numerals i.e. 47 and 48, respectively. A superheater bank 52 of radial superheater tubes 53 is arranged in the space between banks 50 and 51 in arcuate section 34. Superheater tubes 53 are bent in the same manner as boiler tubes 45 and are connected at the upper and lower portions to upright superheater headers 54 and 55, respectively. Circular metal strips 56 (Fig. 1) are arranged on the sides of the upper and lower upright headers away from chamber 19 and cooperate with partition 31 and metallic linings 42 and 43 to prevent discharge of combustion gases from arcuate sections 33 and 34 through the spaces between the upright headers. An upper upright header and a correspondingly disposed or aligned lower upright header serve as inlet and outlet headers for one or more radial groups of tubes; in the present example, two radial groups of tubes are associated with each pair of aligned upper and lower headers (Fig. 4). It is apparent that if one or more of the tubes of a radial group or groups associated with the aligned headers fails, then only the latter need to be removed from the vapor generator without disturbing the other tubes in the gas passage 32.

Figure 3:
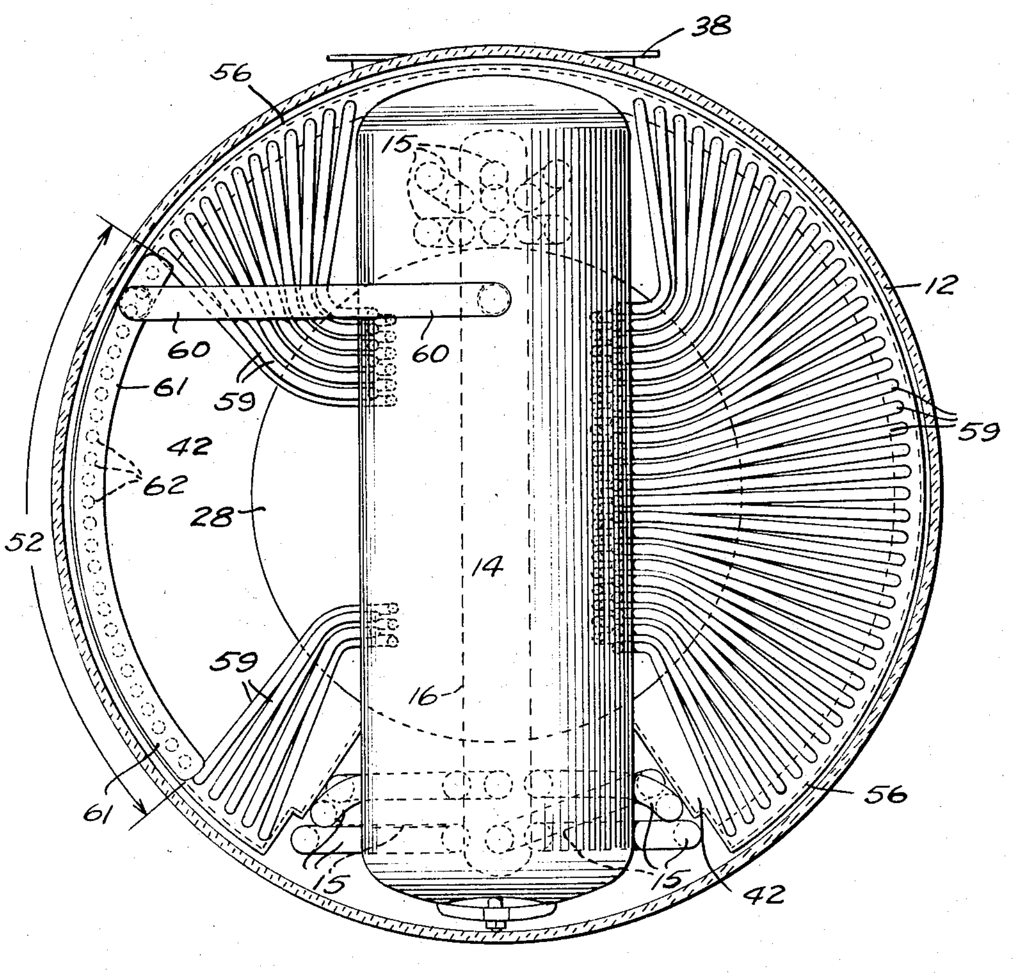
Fig. 3 is a top plan view, partly in section, taken on the line 3—3 of Fig. 1.

A plurality of tubes 58 are connected to header 16 in bottom air space 30 and extend substantially parallel to lower refractory sheet 17. Tubes 58 are connected at their other ends to the lower upright vertical headers 48 in both arcuate sections 33 and 34 to communicate the latter with header 16. Since the headers 48 serve as inlets for tubes 45, they will be designated hereinafter as inlet headers and headers 47 will be designated as outlet headers. A plurality of tubes 59, disposed in air chamber 14A, are connected to the outlet headers 47 in both arcuate sections 33 and 34 and at their other ends to steam and water drum 14. An offtake steam conduit 60 communicates with the steam space of drum 14 to conduct steam to an arcuate superheater header 61 arranged in air space 14A (Figs. 1 and 3). A plurality of vertical tubes 62 extend from arcuate header 61 and are connected to the individual upright superheater headers 54. A lower arcuate shaped superheater header 63 is arranged adjacent the bottom of vapor generator 11 and is connected to lower upright header 55 by conduits 64 to carry away superheated steam from superheater bank 52.

An air inlet port 65 (Fig. 4) is provided in the front portion of casing 12 to supply combustion air to the combustion air to the combustion chamber and air for the air spacer 14A and 30 and the spaces between the casing 12 and the vapor generating elements. The air for the mentioned spaces is for the purpose of cooling the casing and heating the air.

Figure 8:
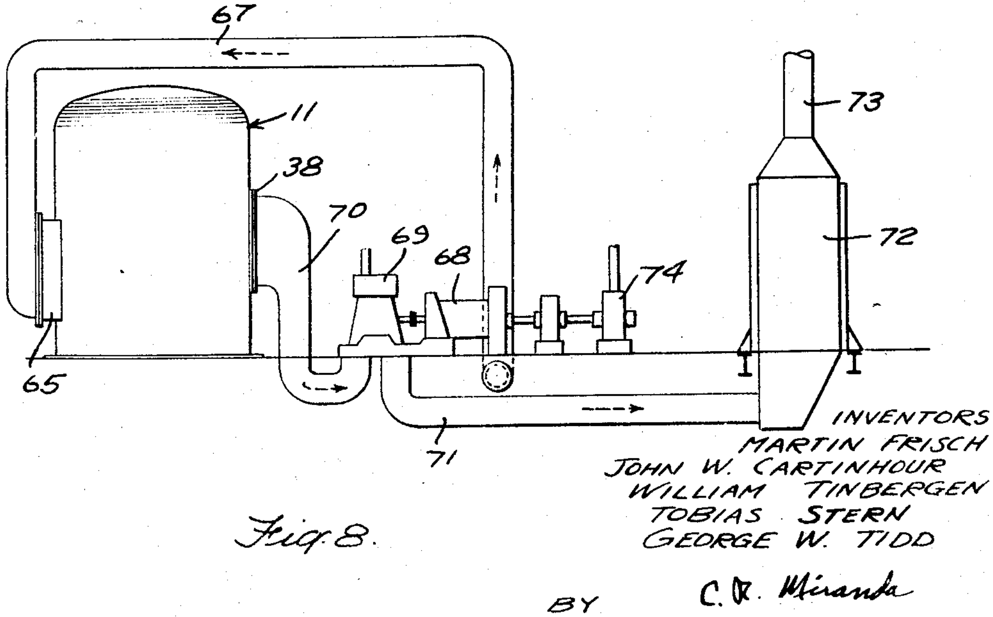
Fig. 8 is a diagrammatic view of the arrangement of the apparatus associated with the vapor generators of the present invention.

As shown in Fig. 8, air under pressure and of a high density is supplied to the vapor generator through conduit 67 which is in communication at one end with the air inlet 65 of the vapor generator and at the opposite end is connected to an air compressor 68. The air compressor 68 is driven by a gas turbine 69 which turbine is actuated, as shown, by gases of combustion from the vapor generator. The gases of combustion flow from the vapor generator through the gas outlet 38 into a conduit 70 thence to the turbine. Exhaust gas from the turbine flows through a conduit 71 through an economizer 72 to a stack 73. In starting up the vapor generator of the present invention, it may be necessary in order to secure air of the proper density and pressure to drive the compressor 68 by a turbine or an electric motor 74.

In operation, the vapor generator of the present invention is started by lighting the burners (not shown) which causes a stream of gases to flow into combustion chamber 19. The combustion gases in chamber 19 flow out through furnace gas outlets 26 and 27 in two separate streams, one stream passing through arcuate section 33 of gas passage 32 in a counterclockwise direction (Fig. 4) and the other stream passing through arcuate section 34 in a clockwise direction. The gases pass in heat exchange relationship with the tubes in the gas passage and are discharged therefrom through combustion gas outlet 38. Water is introduced into drum 14 through means (not shown) and the water passes down through downcomer conduits 15, outside the furnace, into supply header 16. From header 16, water flows into vapor generating or furnace tubes 18 where part of the water is changed to steam by radiant heat and the steam flows upwardly into drum 14. Water from header 16 also flows through tubes 58 into upright inlet headers 48, in both arcuate sections 33 and 34, from whence the water is conducted into the associated radial groups of tubes 45. The water in tubes 45 flows in heat exchange relationship with the combustion gas from the combustion chamber and some of the water changes into steam which flows through upper upright outlet headers 47 thence through tubes 59 into drum 14. Steam in drum 14 passes through offtake conduit 60 into upper arcuate superheater header 61, thence through conduits 62 to vertical headers 54. The steam then passes through tubes 53 in heat exchange relationship with the combustion gases flowing through arcuate section 34 of gas passage 32 where the steam is superheated. The superheated steam is then collected in lower vertical headers 55 from where it is conducted to lower outlet header 63 for use in steam utilization apparatus.

Figure 5:
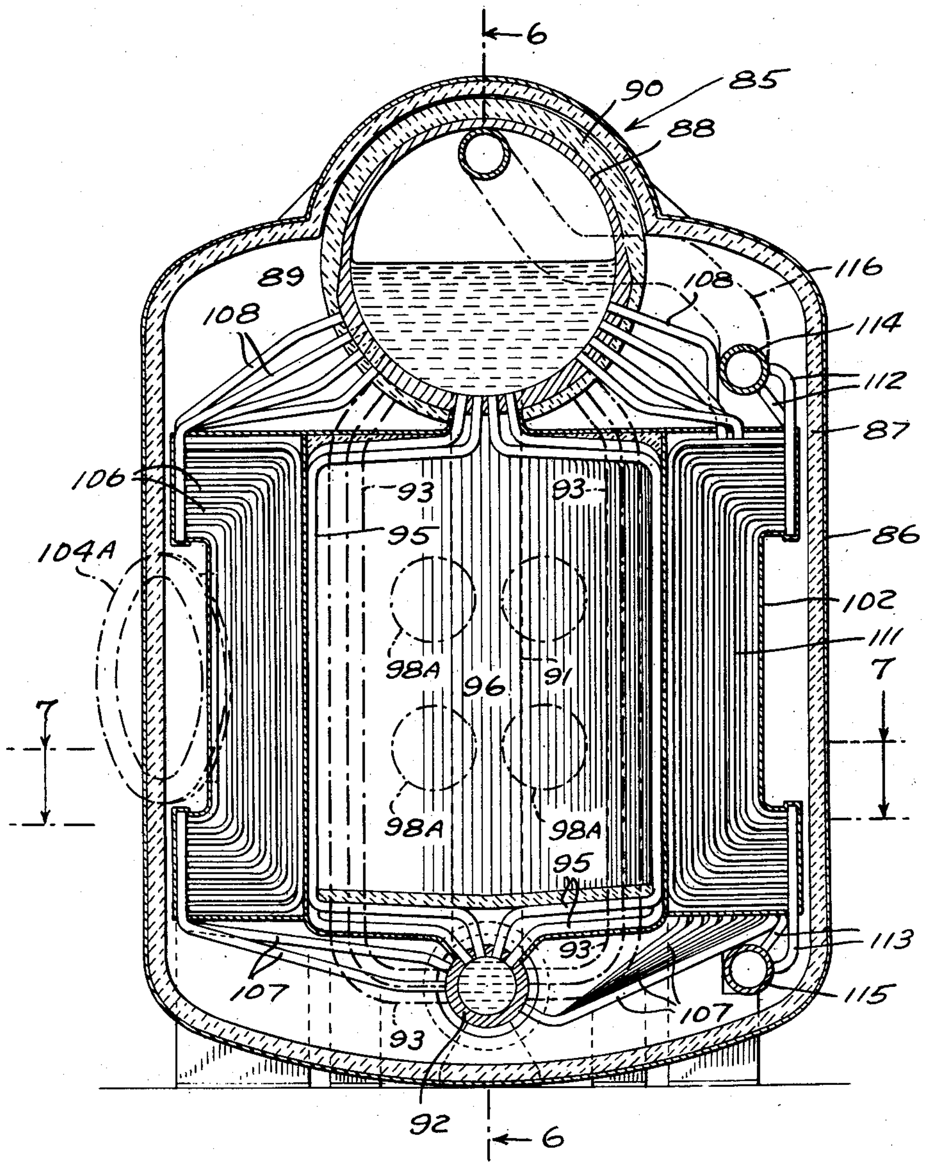
Fig. 5 is a sectional view, in elevation, of a vapor generator constituting a second embodiment of the present invention.
Figure 6:
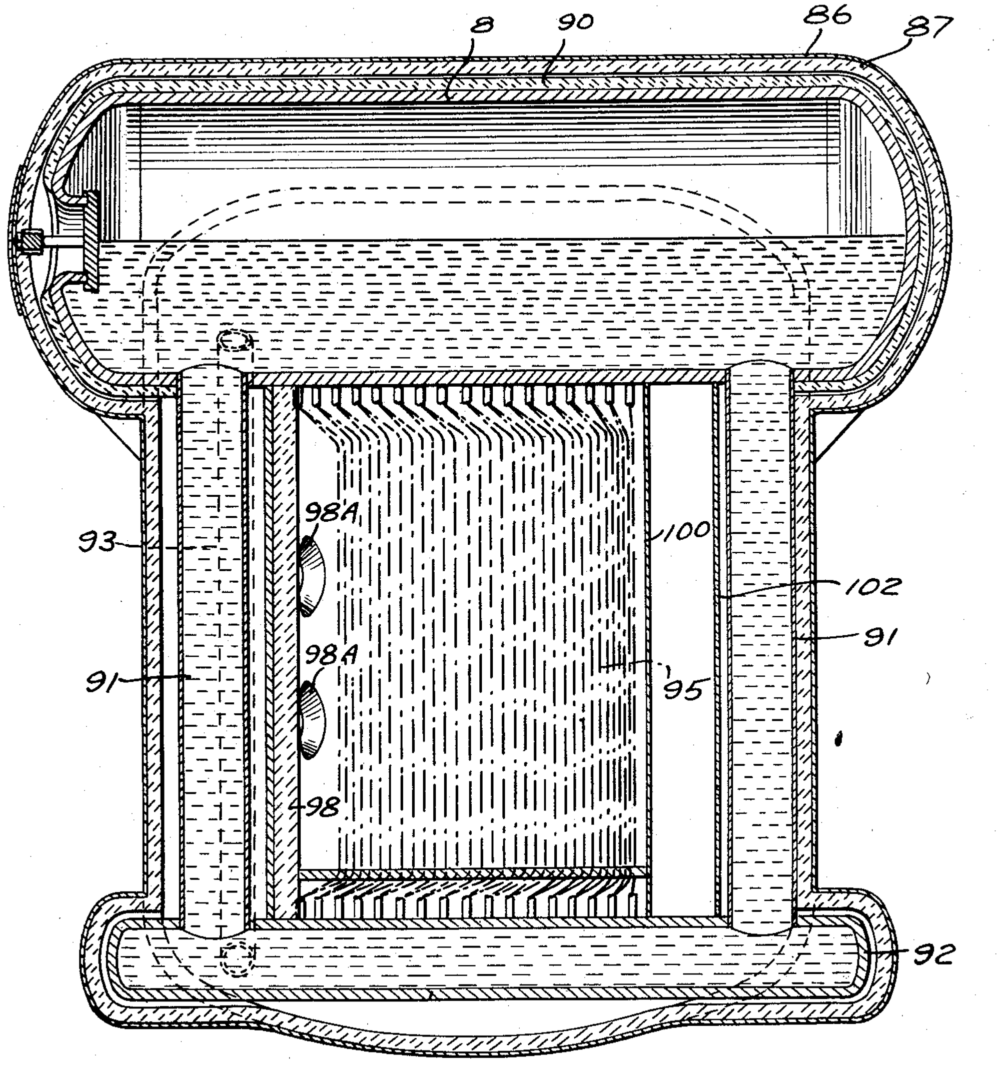
Fig. 6 is a sectional view, in elevation, taken on the line 6—6 of Fig. 5.
Figure 7:
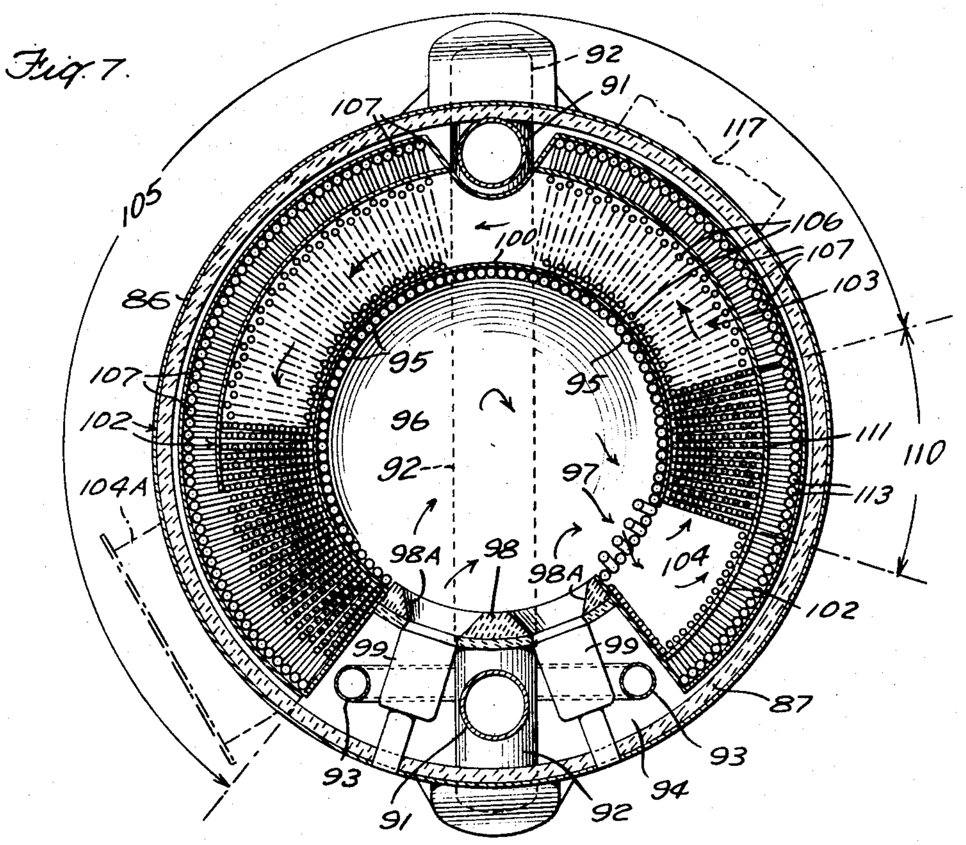
Fig. 7 is a transverse sectional view taken on the line 7—7 of Fig. 5.

Figs. 5 to 7 disclose a vapor generator 85 constituting a second embodiment of the present invention and is similar in many respects to the embodiment shown in Figs. 1 to 4. The vapor generator 85 comprises a substantially cylindrical metal casing 86 lined on the inside with insulation 87. The bottom of casing 86 is substantially dished shaped for pressurizing purposes and the upper part of the casing is partly dished shaped with the uppermost horizontal portion being shaped semi-cylindrical to accommodate a horizontal steam and water drum 88. Drum 88 is arranged in an air space 89 and is totally enclosed by insulation 90. A large diameter downcomer conduit 91 is arranged in the front and the rear of casing 86 and communicates with a horizontal supply header 92 arranged in the bottom of the casing to conduct water from drum 88 to the header. A pair of supplemental downcomer conduits 93 of smaller diameter than conduit 91 are arranged in an air space 94, located to the front of casing 86, and also communicate drum 88 with supply header 92.

A plurality of tubes 95 extend from the upper portion of supply header 92 and run upwardly in a circular manner to define a combustion chamber 96. The arrangement of tubes 95 in the present embodiment is substantially the same as the arrangement of tubes 18 in the first embodiment. Tubes 95 communicate at their other ends with drum 88 and some of the tubes adjacent the front of casing 86 are displaced (Fig. 7) to form a furnace gas outlet 97 for discharging furnace combustion gases from chamber 96. An arcuate and vertical front wall 98 is provided adjacent the front of vapor generator 85 and has openings 98A which accommodate burners 99 seen in Fig. 7, the burners receiving the combustion air from within air space 94. A curved and concentric metal partition 100 is arranged on the side of the furnace tubes 95 away from the combustion chamber 96 and extends from one edge of wall 98 clockwise to furnace gas outlet 97. A second metal partition 102, concentric with partition 100, is arranged between the latter and casing 86 to form an annular gas passage 103. A plenum chamber 104 is provided in gas passage 103 and communicates with furnace gas outlet 97 to receive furnace gas from chamber 96 for travel in gas passage 103. A combustion gas outlet 104A to the left of header 92 (Fig. 7) is provided in casing 86 and receives combustion gases from passage 103 through a cut-out portion in partition 102 to conduct said gas outside the casing. A bank 105 of vapor generating or boiler tubes 106 is arranged in arcuate passage 103 in the same manner as tubes 45 in the first embodiment and extends clockwise from the cut-out portion in partition 102 for more than 180 degrees. Tubes 106 are not connected to individual upright headers as in the first embodiment but rather they are connected at their lower and upper portions to vertical portions of tubes 107 to 108, respectively (Fig. 5). Tubes 107 are connected at their other ends to supply header 92 and the other ends of tubes 108 are connected to drum 88 to thereby communicate the supply header with the drum through tubes 106.

As seen in Fig. 7, a superheater bank 110 of superheater tubes 111 is arranged in gas passage 103 between the plenum chamber 104 and the bank 105 of boiler tubes 106. The upper and lower portions of superheater tubes 111 are connected to vertical portions of tubes 112 and 113, respectively, (Fig. 5). Tubes 112 are in communication with an arcuate superheater inlet header 114 located in air space 89 and tubes 113 are connected to an arcuate superheater outlet header 115 located at the bottom of the casing. A steam offtake conduit 116 is located in air space 89 and communicates the steam space of drum 88 with superheater inlet header 114.

An air inlet 117 (Fig. 7) is provided in casing 86 to conduct air to the inside of said casing to thereby provide combustion air for the burners and air for the air spaces and the spaces between the insulation 87 and the generator elements.

In operation, the vapor generator 85 is started by lighting the burners 99 which causes a stream of hot gases to flow into combustion chamber 96. The combustion gases in chamber 96 flow out through furnace gas outlet 97 and into plenum chamber 104. The gases then pass over superheater tubes 111 and over boiler tubes 106 in gas passage 103 to discharge from the latter and casing 86 through gas outlet 104A. It will be noted that the gas flows counterclockwise in passage 103 and travels for more than 300° (Fig. 7) before being discharged. Water is introduced into drum 88 through means (not shown) and the water passes through downcomer conduits 91 and 93 into supply header 92. From header 92, water flows into vapor generating or furnace tubes 95 where part of the water is changed to a vapor or steam by radiant heat and the steam flows upwardly into drum 88. Water from header 92 also flows through tubes 107 thence through boiler tubes 106 and tubes 108 into drum 88. Steam in drum 88 passes through offtake conduit 116 into superheater inlet header 114 thence through tubes 112 and into tubes 111 in heat exchange relationship with the combustion gases wherein the steam is superheated. The superheated steam then passes downwardly through tubes 113 into superheater outlet header 115 which is connected to steam utilization apparatus (not shown).

The apparatus shown in Fig. 8 is also contemplated for use with vapor generator 85, the latter being substituted for the generator 11 shown in Fig. 8 by making appropriate connections to the inlet and outlet of casing 86.

It will be seen from the foregoing that the present invention provides a novel and compact vapor generator. By utilizing a cylindrical furnace and concentric rows of boiler and superheater tubes, a vapor generator of simple construction is provided. It may be seen further that the connection of radial groups of tubes to a pair of the aligned headers decreases maintenance cost and provides for repair of radial groups of tubes in relatively short periods of time.

Figure 9:
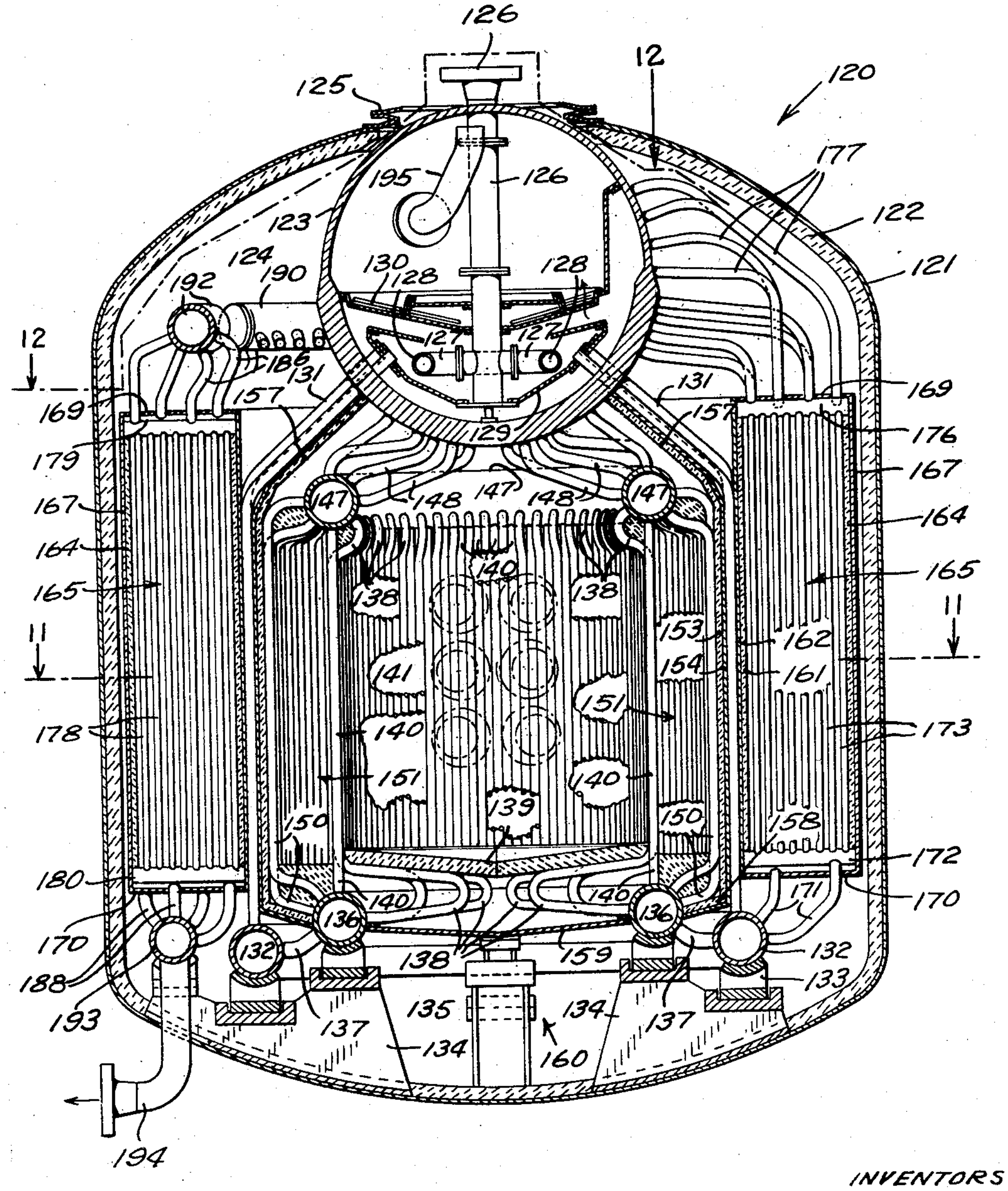
Fig. 9 is a sectional view, in elevation, of a vapor generator constituting a third embodiment of the present invention and is taken on the line 9—9 of Fig. 11.
Figure 10:
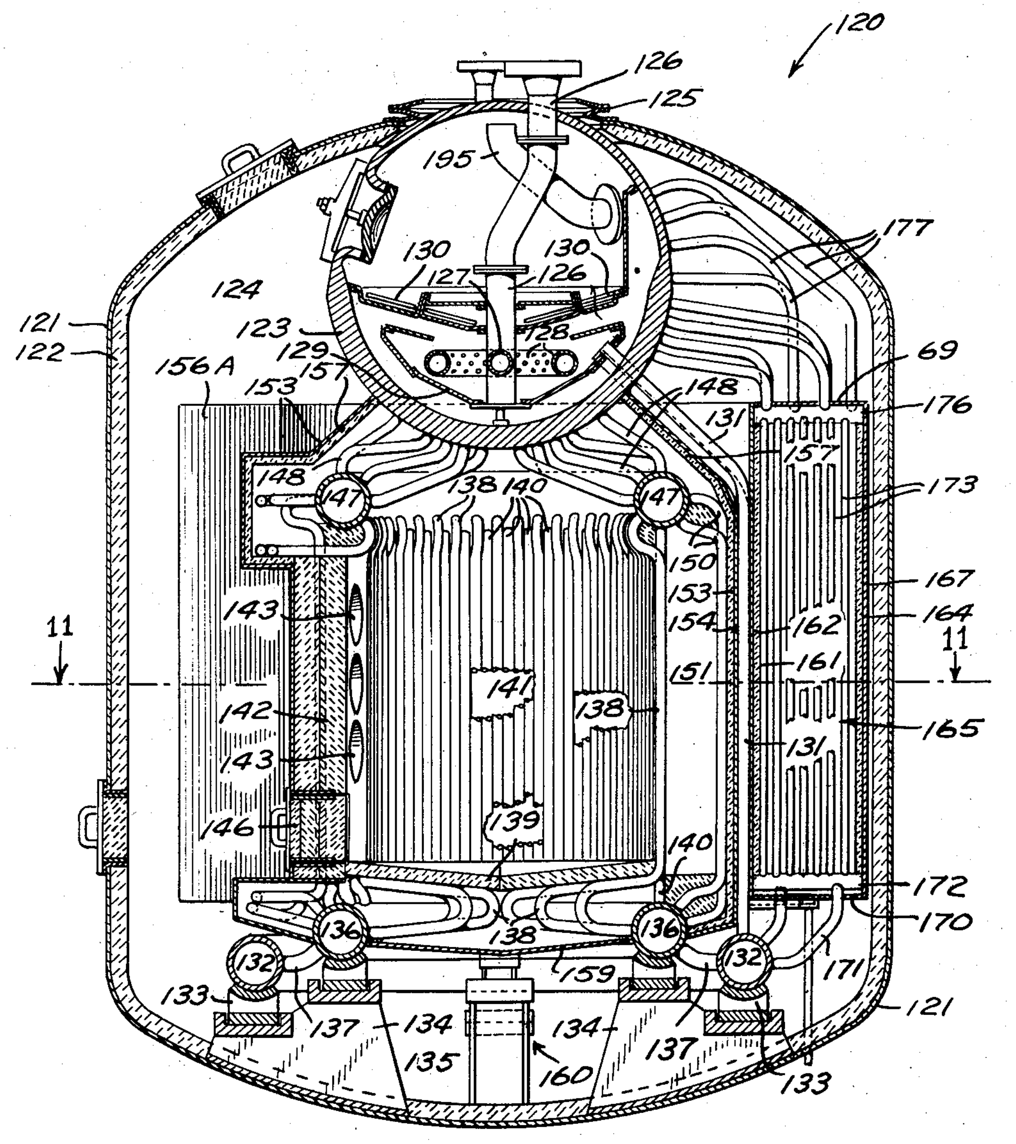
Fig. 10 is a sectional view, in elevation, taken on the line 10—10 of Fig. 11.
Figures 12, 13:
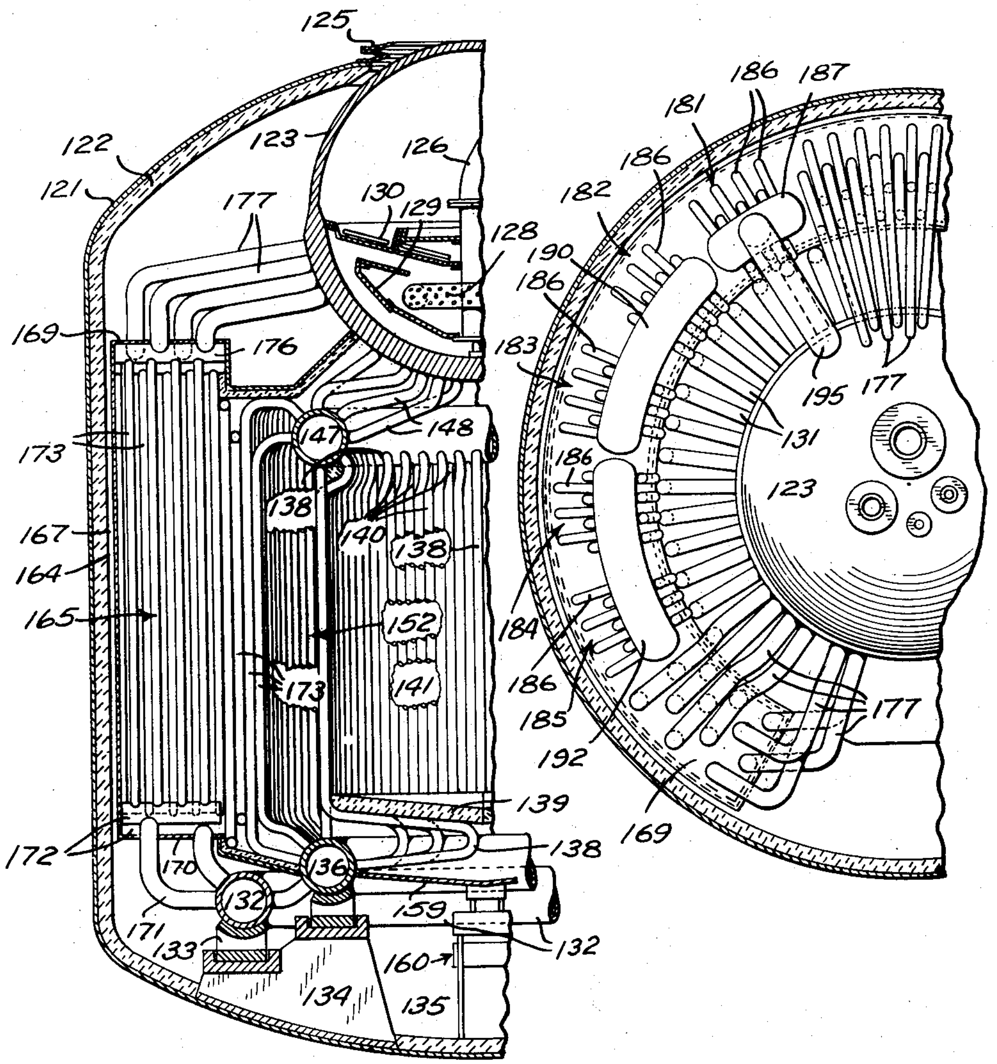
Fig. 12 is a section of part of the vapor generator of Fig. 9 taken on the line 12—12 of Fig. 9 and shows in particular a portion of the superheater arrangement of the vapor generator.
Fig. 13 is a sectional view, in elevation, of part of the vapor generator taken on the line 13—13 of Fig. 11.

Figs. 9 to 13 disclose a vapor generator 120 constituting a third embodiment of the present invention and comprises a cylindrically shaped and vertically disposed casing 121 having insulation 122 on the inside thereof. The top and bottom of casing 121 are spun into dished or ellipsoidal shape permitting positive pressurizing of the generator and providing a casing capable of withstanding high pressure without reinforcement. A spherical steam and water drum 123 is arranged in an air space 124 at the upper portion of the generator and the top of the drum projects through an opening formed in casing 121. Disposed in the last-mentioned opening and secured to drum 123 and casing 121 is an expansion joint and seal 125 which permits expansion and contraction of the drum without causing rupture of the casing and insulation 122. A feed water inlet conduit 126 projects into drum 123 and includes branch connections 127 extending at right angles to the conduit 126 and a closed annular tube 128 communicating with the connection 127 and having perforations for discharging water. Disposed in drum 123 are drum internals which comprise a lower perforated plate arrangement 129, below branch connections 127, and an upper perforated plate arrangement 130 above the branch connections. A plurality of downcomer conduits 131 have adjacent ends secured to the plate arrangement 129 and extend out of the drum 123 in an inclined and radial manner for a distance and then run vertically and parallel to the longitudinal axis of casing 121 in a circular manner (Figs. 9 and 12). The opposite and adjacent ends of downcomer conduits 131 are secured to a closed ring-shaped or torus supply header 132 arranged adjacent the bottom of casing 121 to communicate drum 123 with the header. Header 132 is supported by piers 133 which in turn are carried by support mountings 134 in an air space 135 adjacent the casing bottom. In this manner, spherical drum 123 is supported by the downcomer conduits 131 which are in turn supported by the torus header 132. A second closed ring-shaped or torus header 136 is arranged concentric with header 132 and is in communication therewith by means of connecting conduits 137. Header 136 similarly is supported by piers carried by support mountings 134.

A plurality of tubes 138 are connected to header 136 at spaced points along the inner periphery thereof and extend radially therefrom toward the longitudinal axis of the casing 121 (Fig. 9). The tubes 138, adjacent said longitudinal axis, are bent substantially 180° and extend away from the axis to adjacent to and above header 136 where the tubes are bent at right angles to run upwardly and vertically in the casing. The portions of tubes 138 which extend away from the longitudinal axis of the casing, support a circular refractory sheet 139 which comprises two inclined half sections; the latter being shown in Figs. 9 and 10 but omitted from Fig. 11 to more clearly disclose the arrangement of the last-mentioned portions of tubes 138. The vertical portions of tubes 138 are arranged in a circular manner concentric with the casing axis and are spaced peripherally to accommodate alternate vertical tubes 140 connected at their lower ends to header 136. Tubes 140 and the vertical portions of tubes 138 substantially define a vertical combustion chamber 141, the remainder of the chamber being defined by an arcuate front wall 142 disposed toward the front of casing 121. Arcuate wall 142 has openings 143 therein each of which accommodates a burner (one shown in Fig. 11). Adjusting means 145 (Fig. 11) are provided for moving the burners 144 relative to the opening 143. Wall 142 includes a removable section 146 (Fig. 10) to provide access to the combustion chamber. The upper end portions of tubes 138 (Fig. 9) are bent toward the combustion chamber axis and then away from the latter for connection to an upper ring-shaped or torus header 147 aligned with lower header 136 and concentric with the latter and header 132. Tubes 148 are connected at adjacent ends to torus header 147 and at their opposite ends to drum 123 (Fig. 9). The vertical portions of tubes 138 adjacent front wall 142 are spread apart to form a furnace gas outlet 149 which provides for discharge of combustion gases from combustion chamber 141.

Tubes 150 are connected to lower header 136 and extend therefrom to run upwardly in spaced radial relationship with furnace tubes 138 and 140 (Fig. 9). The tubes 150 are arranged concentric with tubes 138 and 140 and provide an annular passage 151 which receives combustion gases from chamber 141 and conducts said gases in heat exchange relationship with the sides of tubes 138 and 140 away from the combustion chamber and with tubes 150. Tubes 150 to the left of and adjacent front wall 142 are bent (Fig. 11) to form a combustion gas outlet 152 for annular passage 151. Combustion chamber 141 is gas tight except for furnace gas outlet 149 because tubes 138 and 140 are in contact and prevent passage of gases therebetween and annular passage 151 is also gas tight, except for combustion gas outlet 152 by reason of the contacting portions of tubes 150. A curved insulating partition 153, having a metal lining 154, is arranged on the side of tubes 150 away from the furnace (Fig. 9) and has ends terminating adjacent the gas outlets 149 and 152. A radial wall 155 (Fig. 11), in engagement with a longitudinal edge of front wall 142 adjacent furnace gas outlet 149, extends to and in engagement with curved partition 153 to seal off one end of passage 151, and a similar wall 156 having a lining 156A in engagement with the other longitudinal edge of wall 142, extends further radially, to a point short of insulation 122 on casing 121. From Fig. 11 it may be seen that tubes 138 are arranged radially along one side of wall 155 while the tubes extend radially only part of the way along 156. The top portion of partition 153 is inclined as at 157 and the edges thereof are in engagement with drum 123 to seal the chamber 141 from air space 124, while the lower portion of the partition 153 is also inclined as at 158 and in engagement with lower header 136. A metal baffle 159 is arranged within the space encompassed by header 136 and seals the combustion chamber from air space 135 at the bottom of casing 121. Baffle 159 is supported by frame work 160 resting on the bottom dished portion of vapor generator 120.

Spaced from and concentric with partition 153 is a second curved insulating partition 161 having a lining 162 in contact with downcomer conduits 131. A wall 163 (Fig. 11) is disposed normal to and in engagement with partitions 153 and 161 adjacent combustion gas outlet 152 (Fig. 11) to maintain the downcomer conduits 131 out of contact with gases passing through the outlet 152. It will be noted that the longitudinal edges of partitions 153 and 161 adjacent furnace gas outlet 149 are not joined but are opened to air spaces 124 and 135 so that air from the latter may circulate among the downcomer conduits.

Figure 11:
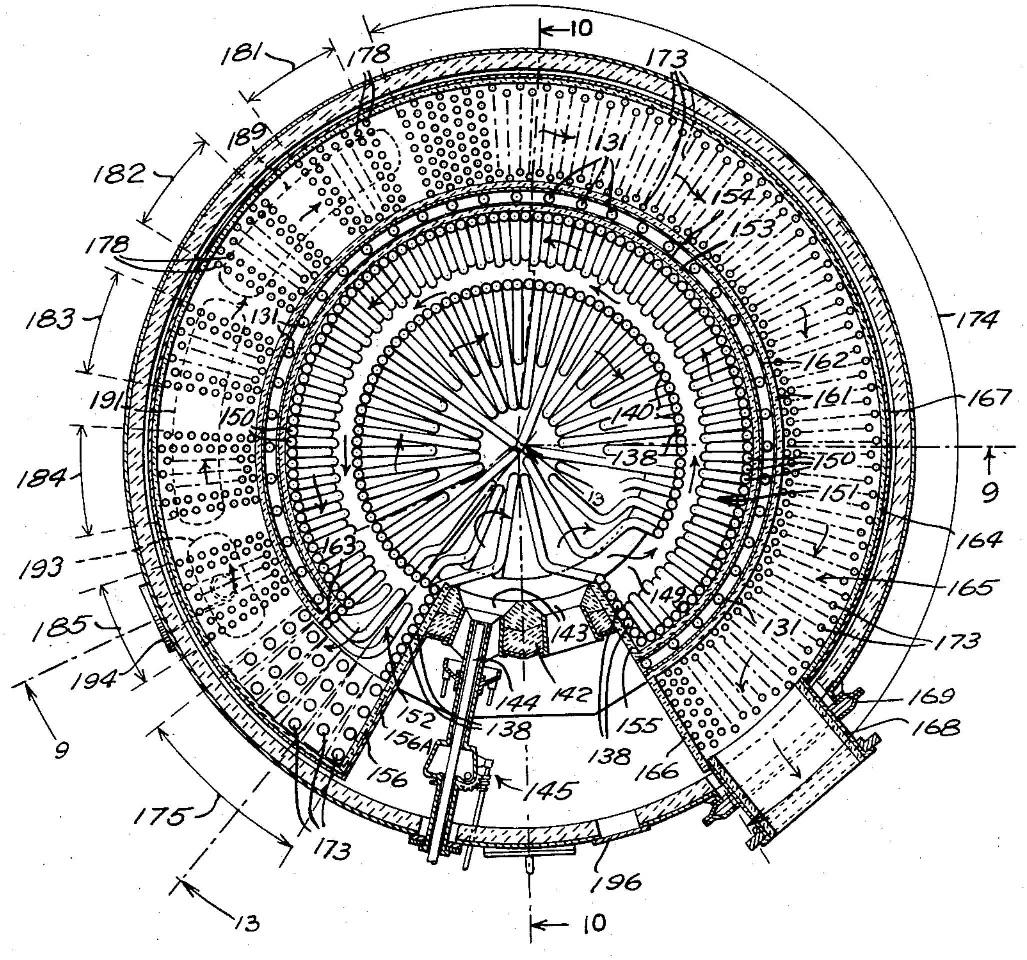
Fig. 11 is a horizontal section taken on the line 11—11 of Figs. 9 and 10.

A third curved insulating partition 164 is arranged between partition 161 and casing 121 and concentric therewith to form a second annular gas passage 165. Partition 164 has one vertical edge in engagement with wall 156, to the left of front wall 142 (as seen in Fig. 11), and extends in a circular manner to a radail wall 166 in radial alignment with wall 155. Curved partition 164 is provided with a lining 167 and has an opening therein communicating with a casing gas outlet 168 extending from casing 121. An expansion joint and seal 169 is provided for gas outlet 168 to permit movement of the latter with changes in temperature. Gas passage 165 is closed at the top and bottom portions from the air spaces by sheet metal walls 169 and 170, respectively.

A plurality of tubes 171 are connected to lower torus header 132 and to lower horizontal inlet headers 172 which are arranged radially in the lower portion of gas passage 165. Each of the inlet headers 172 has a group of vertical tubes 173 connected thereto which are arranged along a radial line and the tubes 173 in the passage 165 form rows concentric with the insulating partitions. A bank 174 of tubes 173 (Fig. 11) extends in passage 165 from wall 166 counterclockwise for almost 180° and a second bank 175 (Fig. 11) of tubes 173 extends clockwise from wall 156 for a short distance in front of combustion gas outlet 152; the tubes 173 in bank 175 having larger diameters than those of the tubes in banks 174. The upper ends of tubes 173 are connected to horizontal outlet headers 176 (Figs. 9, 10 and 13) each of which headers is in alignment with a corresponding lower inlet header 172. Riser tubes 177 are connected to outlet headers 176 and drum 123 to communicate tubes 173 with the drum.

Disposed in the space between banks 174 and 175 in gas passage 165 are vertical superheater tubes 178 (Fig. 9) which are arranged in the passage in the same radial and concentric manner as tubes 173. Tubes 178 are connected at their upper ends to horizontal superheater headers 179 and at their lower ends to horizontal superheater headers 180 which are in alignment with headers 179. Superheater tubes 178 are arranged in five banks 181, 182, 183, 184 and 185, which banks extend counterclockwise (Fig. 11) from bank 174 to bank 175. The headers 179 associated with bank 181 are connected by tubes 186 (Figs. 9 and 12) to an upper arcuate-shaped superheater header 187 (Fig. 12) arranged transversely of the bank 181 and the headers 180 of the latter are connected by tubes 188 to a lower arcuate header 189 (shown in broken lines in Fig. 11). For purposes of clarity, the tubes connecting the upper arcuate headers, above the superheater banks, to the headers 179 will all be designated by the numeral 186 while the tubes connecting the headers 180 to the lower arcuate superheater header will be designated by the numeral 188. Header 189 extends transversely below bank 182 and is in communication with the tubes of said bank by way of connecting tubes 188 and lower headers 180. A second upper arcuate header 190 (Figs. 9 and 12) is arranged above banks 182 and 183 and is in communication with the tubes 178 thereof. A lower arcuate header 191 (Figs. 9 and 11) is arranged below and communicates with the tubes of banks 183 and 184 while a third upper arcuate header 192 (Fig. 12) extends above and across banks 184 and 185 and is in communication with both of the latter. A third lower arcuate header 193 (Fig. 11) extends below bank 185 only and is in communication with the tubes of the latter. Header 193 is the outlet header for the superheater and an outlet conduit 194 is connected thereto and is in communication with steam utilization apparatus not shown). A steam offtake conduit 195 is connected at one end to drum 123 (Fig. 9) and at the other end (Fig. 12) to superheater header 187 to provide the latter with steam.

From the foregoing, it is apparent that the superheater banks are arranged in series-flow relationship. Steam in header 187 flows through the tubes of bank 181 into lower header 189 and from the latter through tubes 178 of bank 182 into upper header 190. The steam in header 190 flows through the tubes of bank 183 into lower header 191 and from the latter through the tubes of bank 184 into upper header 192. From header 192 the steam then flows through the tubes of bank 185 into lower header 193 from whence it passes into outlet conduit 194.

An air inlet 196 is provided in casing 121 (Fig. 11) to supply combustion air to the combustion chamber and air for the air spaces 124 and 135 and the spaces between the insulation 122 and generator elements. The air is for the purpose of cooling the casing and heating the combustion air.

Vapor generator 120 is also contemplated for use with the apparatus shown in Fig. 8 by connecting air inlet 196 of vapor generator 120 to conduit 67 (Fig. 8) and connecting casing gas outlet 168 to conduit 70. In this manner, air under pressure and of a high density is supplied to vapor generator 120.

In operation, the vapor generator 120 is started by lighting the burners 144 which causes a stream of gases to flow into combustion chamber 141. The combustion gases in chamber 141 flow out through furnace gas outlet 149 (Fig. 11) into annular passage 151 in a counterclockwise direction in heat exchange relationship with the tubes 138 and 140. The gases in passage 151 discharge from the latter through combustion gas outlet 152 into gas passage 165. In passage 165 the gases flow clockwise in heat exchange relationship with the tubes 173 of bank 175 then the superheater tubes 178 and finally the tubes 173 of bank 174 after which the gases discharge through casing gas outlet 168. Inlet conduits 126 receive feed water from a source (not shown) and the feed water flows through branch connections 127 into annular tube 128 whence it is discharged into drum 123 through the perforations in the tube. The water passes downwardly through downcomer conduits 131 into torus supply header 132. From header 132 the water flows into torus header 136 by way of tubes 137 and then is conducted into tubes 138 and 140 in chamber 141 where part of the water is changed to steam by radiant heat, and the steam flows upwardly into upper torus header 147. Connecting tubes 148 conduct the steam from header 147 to drum 123 in the space below perforated plate arrangement 130. Water from torus header 132 also passes through tubes 171 into lower inlet headers 172 in gas passage 165. The water flows upwardly in tubes 173 in heat exchange relationship with the combustion gases and steam thereby formed is collected in outlet headers 176 whence the steam is conducted by riser tubes 177 to drum 123. The steam in drum 123 passes upwardly through perforated plate arrangement 130 where moisture is removed from the steam and the latter flows out of the drum through offtake conduit 195 into upper superheater inlet header 187. The steam then flows through tubes 178 of series connected superheater banks 181 to 185 where the steam is superheated. The superheated steam from the last bank 185 is collected in outlet superheater header 193 whence it is discharged through outlet conduit 194.

By arranging the concentric rows of tubes in the manner disclosed in the third embodiment of the present invention, the row of furnace tubes is exposed on both sides to heat thereby providing for maximum heating surface of said tubes.

While the invention has been shown and described as used for the generation of steam from water, it will be understood that it is capable of use in generating vapor from liquids in general.

Although several embodiments of the invention have been illustrated and described in detail, it is to be expressly understood that the invention is not limited thereto. Various changes may be made in the design and arrangement of the parts without departing from the spirit and scope of the invention as will be understood by those skilled in the art.

What is claimed is:

1. A vapor generator comprising a casing, a plurality of vapor generating tubes arranged to substantially define a cylindrical-shaped combustion chamber, the vapor generating tubes being spaced apart along two portions of the wall of said combustion chambers to provide a pair of gas outlets, means for firing the combustion chamber whereby combustion gases are formed therein, means forming an arcuate gas passage concentric with the combustion chamber and in communication with said pair of gas outlets to receive combustion gases therefrom, said gas passage being divided in two sections, one of said sections being associated with one of said pair of gas outlets and receiving the combustion gases therefrom, and the other of said pair of gas outlets being associated with the other of said gas outlets and receiving the combustion gas therefrom, a casing gas outlet in communication with both sections of said gas passage and adapted to receive the combustion gases flowing through each of said sections, fluid conducting tubes arranged in said gas passage in groups of radially aligned tubes and in heat exchange relationship with the combustion gases, said groups being each disposed in separate radial planes spaced circumferentially in said gas passage, pairs of aligned headers associated with the groups of the radially aligned tubes with one pair of headers communicating with at least one group of radially aligned tubes and arranged in the radial plane of said associated group in said gas passage, one of said one pair of headers being connected to adjacent ends of said communicating group of radially aligned tubes and the other of said one pair of headers being connected to the opposite adjacent ends of said communicating group of radialy aligned tubes, a vapor and liquid container arranged at one end of said combustion chamber, a liquid container arranged at the other end of said combustion chamber, and downcomer means communicating the vapor and liquid container with the liquid container, said vapor and liquid container and said liquid container communicating wth the vapor generating tubes and the fluid conducting tubes.

2. The vapor generator of claim 1 wherein the pair of gas outlets are arranged at adjacent ends of said two sections of said gas passage, and the casing gas outlet is arranged midway of said gas passage and at the opposite adjacent ends of said two sections.

3. A vapor generator comprising a setting, a plurality of fluid conducting tubes arranged to substantially define a cylindrical combustion chamber having a gas outlet, means for firing said combustion chamber whereby combustion gases are formed therein, means forming an arcuate gas passage concentric with said combustion chamber and in communication with said gas outlet, a plurality of second fluid conducting tubes arranged in said gas passage in groups of radially aligned tubes, said groups being each disposed in separate radial planes spaced circumferentially in said gas passage, pairs of aligned headers associated with the groups of the radially aligned tubes with one pair of headers communicating with at least one group of radially aligned tubes and arranged in the radial plane of said associated group in said gas passage, one of said one pair of headers being connected to adjacent ends of said communicating group of radially aligned tubes and the other of said one pair of headers being connected to the opposite adjacent ends of said communicating group of radially aligned tubes, a vapor and liquid container arranged at one end of said combustion chamber, a liquid container arranged at the other end of said combustion chamber, downcomer means communicating the vapor and liquid container with the liquid container, said vapor and liquid container and said liquid container beng n communcaton with said pairs of aligned headers and said first and second fluid conducting tubes.

4. The vapor generator of claim 3 where the groups of radially aligned tubes in the gas passage present concentric rows of tubes in transverse cross section.

5. A vapor generator comprising a casing, a group of fluid conducting tubes arranged to substantially define a vertical and cylindrical-shaped combustion chamber having a gas outlet, means for firing said combustion chamber whereby combustion gases are formed therein, means for forming an arcuate gas passage concentric with the combustion chamber and in communication with the gas outlet, a plurality of generally vertical second fluid conducting tubes arranged in said gas passage in groups of radially aligned tubes, said groups being each disposed in separate radial planes spaced circumferentially in said gas passage, pairs of aligned headers associated with the groups of radially aligned tubes with one pair of headers communicating with at least one group of radially aligned tubes and arranged in the radial plane of said associated group in said gas passage, one of said pair of headers being connected to the upper adjacent ends of said communicating group of radially aligned tubes and the other of said pair of headers being connected to the lower adjacent ends of said communicating group of radially aligned tubes, a vapor and liquid container arranged at the upper portion of the casing, a liquid container arranged at the lower portion of the casing, downcomer means communicating the vapor and liquid container with the liquid container, means communicating the first-mentioned fluid conducting tubes and the lower headers with the liquid container, and means communicating the upper headers with the vapor and liquid container.

6. The vapor generator of claim 5 wherein the upper and lower ends of the generally vertical second fluid conducting tubes are bent to extend away from the combustion chamber and the connected headers are arranged vertically and circumferentially along the outer periphery of said arcuate gas passage.

7. A vapor generator comprising a vertically disposed and cylindrical casing, a vapor and liquid container arranged in the upper portion of the casing and extending transversely thereof, a liquid container arranged in the lower portion of the casing and extending in the same direction as the vapor and liquid container, downcomer means communicating the vapor and liquid container with the liquid container, a plurality of vapor generating tubes having lower ends connected to the liquid container along spaced longitudinal points on the latter, said tubes extending outwardly and horizontally from the liquid container in a substantially radial manner and then bent upwardly and vertically to define the wall of a substantially cylindrical shaped combustion chamber, said tubes further being bent at the upper edge of said chamber wall to extend inwardly and horizontally to form the top of said combustion chamber, the tubes at the top of said combustion chamber being connected to the vapor and liquid container, an arcuate gas passage formed on the side of the vapor generating tubes away from the combustion chamber and arranged concentric with the latter, a plurality of generally vertical second vapor generating tubes arranged in said gas passage and in concentric rows, a plurality of superheater tubes arranged and shaped similar to said second vapor generating tubes and disposed in said gas passage, said second vapor generating tubes and said superheater tubes being arranged in groups of radially aligned tubes, said groups being each disposed in separate radial planes spaced circumferentially in the gas passage, pairs of aligned headers associated with the groups of the radially aligned tubes with one pair of headers communicating with at least one group of radially aligned tubes and arranged in the radial plane of said associated group in said gas passage, one of said one pair of headers being connected to adjacent ends of said communicating group of radially aligned tubes and the other of said one pair of headers being connected to the opposite adjacent ends of said communicating group of radially aligned tubes, means communicating the vapor and liquid container and the liquid container with the headers of said second vapor generating tubes, and means communicating the vapor and liquid container with the headers of said superheater tubes.

8. A vapor generator comprising a vertically disposed and cylindrical casing, a vapor and liquid container arranged in the upper portion of the casing and extending transversely thereof, a liquid container arranged in the lower portion of the casing and extending in the same direction as the vapor and liquid container, downcomer means communicating the vapor and liquid container with the liquid container, a plurality of vapor generating tubes connected at adjacent ends to the vapor and liquid container and at the opposite adjacent ends to the liquid container, said vapor generating tubes having intermediate vertical portions substantially defining the wall of a cylindrical shaped combustion chamber having a gas outlet, means for firing said combustion chamber whereby combustion gases are formed therein, an arcuate gas passage formed on the side of the vapor generating tubes away from the combustion chamber and arranged concentric with the latter, said gas passage communicating with said gas outlet, a plurality of second vapor generating tubes and superheater tubes arranged vertically in groups of radially aligned tubes in said gas passage, said groups being each disposed in separate radial planes spaced circumferentially in said gas passage, pairs of aligned headers associated with the groups of radially aligned tubes with one pair of headers communicating with at least one group of radially aligned tubes and arranged in the radial plane of said associated group in said gas passage, one of said pair of headers being connected to the upper adjacent ends of said communicating group of radially aligned tubes and the other of said one pair of headers being connected to the lower adjacent ends of said communicating group of radially aligned tubes, lower connecting tubes connected to each lower header for the second vapor generating tubes and to the liquid container, said connecting tubes extending substantially radially from said liquid container and disposed out of heat exchange relationship with the combustion gases, upper connecting tubes arranged in a manner similar to the lower connecting tubes and connected to the upper headers for the second vapor generating tubes and to the vapor and liquid container, an upper arcuate shaped and horizontally disposed superheater header arranged above the upper headers for the superheater tubes and out of heat exchange relationship with the combustion gases, means communicating the arcuate shaped superheater header with the vapor and liquid container and the upper headers for the superheater tubes, and a lower arcuate shaped and horizontally disposed superheater header arranged below the lower headers for the superheater tubes and in communication with the latter.

9. A vapor generator comprising a substantially cylindrical casing, a plurality of fluid conducting tubes arranged to substantially define a cylindrical shaped combustion chamber having a gas outlet, means for firing said combustion chamber whereby gases are formed therein, an arcuate shaped gas passage disposed on the side of the fluid conducting tubes away from the combustion chamber and concentric with the latter, said gas passage being in communication with the gas outlet, a plurality of second fluid conducting tubes arranged in said gas passage in groups of radially aligned tubes in concentric rows and in heat exchange relationship with the combustion gases, said groups being each disposed in separate radial planes spaced circumferentially in the gas passage, pairs of aligned headers associated with the groups of the radially aligned tubes with one pair of headers communicating with at least one group of radially aligned tubes and arranged in the radial plane of said associated group in said gas passage, one of said one pair of headers being connected to adjacent ends of said communicating group of radially aligned tubes and the other of said one pair of headers being connected to the opposite adjacent ends of said communicating group of radially aligned tubes, a vapor and liquid container arranged at one end of said combustion chamber, a liquid container arranged at the other end of said combustion chamber, and downcomer conduits communicating the vapor and liquid container with the liquid container and arranged outside said combustion chamber and said gas passage, the first-mentioned fluid conducting tubes being connected to the vapor and liquid container and the liquid container, both said containers being in communication with the second fluid conducting tubes.

10. The vapor generator of claim 9 wherein the combustion chamber gas outlet is disposed adjacent one end of the gas passage, and a second gas outlet is arranged adjacent the other end of said gas passage to provide for discharge of combustion gases from said gas passage.

11. A vapor generator comprising a vertically disposed and substantially cylindrical casing, a plurality of vapor generating tubes arranged to substantially define a cylindrical shaped combustion chamber centrally of said casing, said combustion chamber having a gas outlet, means for firing said combustion chamber whereby combustion gases are formed therein, a vapor and liquid container arranged in the upper portion of the casing, a liquid container arranged in the lower portion of the casing, downcomer means communicating vapor and liquid container with the liquid container, means forming an arcuate gas passage outside said combustion chamber and concentric with the latter, said gas passage being in communication with the gas outlet for receiving combustion gases therefrom, a plurality of generally vertical boiler tubes and superheater tubes arranged in said gas passage in circumferential spaced groups of radially aligned tubes, said groups being each disposed in separate radial planes, the upper and lower ends of said boiler and superheater tubes being bent substantially normal to vertical portions of their respective tubes so that said ends are arranged one above the other, lower connecting tubes each having a vertical end portion connected to the lower ends of a group of radially aligned boiler tubes and the other end connected to the liquid container, upper connecting tubes each having a vertical end portion connected to the upper ends of a group of radially aligned boiler tubes and the other end portion connected to the vapor and liquid container, the vertical end portions of the upper and lower connecting tubes being arranged in the radial plane of its associated group of boiler tubes an arcuate shaped and horizontally disposed superheater header arranged above the upper ends of the superheater tubes, a second arcuate shaped superheater header arranged below the lower ends of the superheater tubes, and second upper and lower connecting tubes each having vertical end portions connected to the upper and lower ends respectively of said superheater tubes and the ends opposite the vertical end portions connected to the upper and lower arcuate shaped superheater header, respectively, the vertical end portions of the upper and lower connecting tubes being arranged in the radial plane of the associated group of superheater tubes.

12. A vapor generator comprising a casing, a plurality of fluid conducting tubes arranged to substantially define a vertical and cylindrical combustion chamber having a gas outlet, means for firing said combustion chamber whereby combustion gases are formed therein, an arcuate partition spaced from and arranged on the side of the fluid conducting tubes away from the combustion chamber to define a gas passage concentric with the latter, said gas passage being in communication with the gas outlet to receive combustion gases therefrom, a plurality of second fluid conducting tubes arranged in said gas passage in heat exchange relationship with the combustion gases, said partition having a portion cut out to form a gas outlet, a vapor and liquid container arranged in the upper portion of the casing and a liquid container arranged in the lower portion of the container, a second arcuate partition arranged concentric with and spaced from the first-mentioned partition, the space between the first and second partitions being in fluid tight relationship with the combustion gases flowing in the gas passage, downcomer conduits in communication with both said containers and extending in the space between said first and second partitions, a third arcuate partition arranged concentric with said second partition to define in combination with the latter a second gas passage, said second gas passage being in communication with the gas outlet of said first-mentioned gas passage to receive combustion gases therefrom, a plurality of third fluid conducting tubes arranged in said second passage and in heat exchange relationship with combustion gases therein, and a casing gas outlet in said casing in communication wth said second gas passage to provde for discharge of the combustion gases from said casing, all of said fluid conducting tubes being in communication with the vapor and liquid container and the liquid container.

13. A vapor generator comprising a casing, a vapor and liquid container arranged in the upper portion of said casing, a plurality of vapor generating tubes arranged to substantially define a vertical and cylindrical combustion chamber having a gas outlet, means for firing said combustion chamber whereby combustion gases are formed therein, an arcuate partition spaced from the vapor generating tubes and arranged concentric therewith to define a gas passage, said gas passage being in communication with said gas outlet to receive combustion gases therefrom and having a gas passage outlet for discharging combustion gases from the gas passage, a plurality of second vapor generating tubes arranged in said gas passage and in heat exchange relationship with the combustion gases therein, an upper torus header arranged adjacent the top of the combustion chamber and in communication with the vapor and liquid container and both said first and second vapor generating tubes, a lower torus header arranged adjacent the bottom of the combustion chamber concentric with the upper torus header and in communication with both said first and second vapor generating tubes, a second arcuate partition arranged concentric with and spaced from said first-mentioned partition, the space between said first and second partition being in fluid tight relationship wth respect to the gases in said combustion chamber and in said gas passage, a second lower torus header arranged concentric with the first-mentioned lower torus header and in communication therewith, downcomer conduits extending in the space between the first and second mentioned partition and circumferentially of the latter, said downcomer conduits being in communication with the vapor and liquid container and said second lower torus header, a third arcuate partition arranged concentric with and spaced from said second partition to define a second gas passage, and a plurality of third vapor generating tubes and superheater tubes arranged in said second gas passage in heat exchange relationship with the gases discharged through the gas passage outlet, said third vapor generating tubes being in communication with the second lower torus header and the vapor and the liquid container, and the superheater tubes being in communication with the vapor and the liquid container.

14. A vapor generator comprising a casing, a row of generally vertical fluid conducting tubes substantially defining a cylindrical combustion chamber having a gas outlet, means for firing said combustion chamber whereby combustion gases are formed therein, an arcuate partition arranged on the side of the fluid conducting tubes away from the combustion chamber and concentric therewith, said partition being spaced from said fluid conducting tubes to provide a gas passage communicating with the gas outlet of said combustion chamber, a row of second fluid conducting tubes arranged in said gas passage concentric with the combustion chamber and in heat exchange relationship with the combustion gases in the gas passage, a second arcuate partition spaced from and concentric with said first-mentioned arcuate partition, the space between said first-mentioned and said second partitions being in fluid tight relationship with respect to the combustion gases from the combustion chamber and gas passage, an upper vapor and liquid container arranged in the upper portion of the casing adjacent the top of the combustion chamber and a lower liquid container arranged in the lower portion of the casing adjacent the bottom of the combustion chamber, downcomer conduits extending in the space between the first and second arcuate partitions and in communication with the vapor and liquid container and the liquid container, said first and second fluid conducting tubes being in communication with the vapor and liquid container and the liquid container, a third arcuate partition arranged concentric with the second partition and spaced therefrom to define a second gas passage in communication with the gas outlet of the first-mentioned gas passage, a plurality of circumferential groups of radially aligned vertical tubes arranged in said second gas passage in heat exchange relationship with the gases therein, and circumferential and horizontally disposed headers connected to the upper and lower ends of each group of radially aligned tubes, said headers being in communication with the liquid container and the vapor and liquid container.

15. A vapor generator comprising a casing, a vapor and liquid container arranged in the upper portion of the casing and a liquid container arranged in the lower portion of the casing, a plurality of generally vertical vapor generating tubes communicating with the liquid container and the vapor and liquid container arranged to substantially define a cylindrical combustion chamber having a gas outlet, means for firing said combustion chamber whereby combustion gases are formed therein, means for forming a gas passage concentric with said combustion chamber and on the side of the vapor generating tubes away from the combustion chamber, means for communicating the gas outlet with the gas passage to provide flow of combustion gas in the latter, a bank of vertical second vapor generating tubes in said gas passage communicating with the liquid container and the vapor and liquid container and in heat exchange relationship with combustion gases flowing therein, vertical superheater tubes arranged in a plurality of circumferential spaced banks in said gas passage, an inlet superheater header communicating with the vapor and liquid container and with the tubes of the first of said superheater banks to conduct vapor to said first bank, an outlet superheater header communicating with the last superheater bank, and connecting superheater headers for the intermediate superheater banks and communicating the latter with each other and with said first and said last superheater banks to cause the vapor in said first superheater bank to pass through each intermediate bank and through said last superheater bank in series flow relationship.

16. A vapor generator comprising a casing, a vapor and liquid container arranged in the upper portion of said casing and a liquid container arranged in the lower portion of said casing, a plurality of generally vertical vapor generating tubes arranged to substantially define a cylindrical shaped combustion chamber having a gas outlet, said vapor generating tubes extending between both said mentioned containers and in communication therewith, means for firing said combustion chamber whereby combustion gases are formed therein, means for forming an arcuate gas passage on the side of the vapor generating tubes away from the combustion chamber and concentric with the latter, means communicating the gas outlet with the gas passage to provide for flow of combustion gases in the latter, a bank of generally vertical second vapor generating tubes arranged in said gas passage and in heat exchange relationship with the combustion gases therein, said second vapor generating tubes being arranged in rows concentric with the combustion chamber and with each other, a plurality of generally vertical superheater tubes arranged in at least three spaced and circumferential superheater banks in said gas passage, a superheater header communicating with the vapor and liquid container and with one end of a first superheater bank to conduct vapor from said vapor and liquid container to said first superheater bank, a second superheater header communicating with opposite end of said first superheater header and with the adjacent end of a second superheater bank to provide for flow of vapor from said first superheater bank to said second superheater bank, a third superheater header communicating with the opposite end of said second superheater header and with the adjacent end of the third superheater bank to provide for flow of vapor from said second superheater bank to said third superheater bank, and a fourth superheater header connected to the opposite end of said third superheater bank for collecting the vapor passing through said last-mentioned superheater bank.

17. A vapor generator comprising a casing, a vapor and liquid container arranged in the upper portion of the casing and a liquid container arranged in the lower portion of said casing, a plurality of generally vertical vapor generating tubes arranged to substantially define a cylindrical shaped combustion chamber having a gas outlet, said vapor generating tubes extending between both said mentioned containers and in communication therewith, means for firing said combustion chamber whereby combustion gases are formed therein, means for forming an arcuate gas passage on the side of the vapor generating tubes away from the combustion chamber and concentric with the latter, means communicating the gas outlet with the gas passage to provide for flow of combustion gases in the latter, a bank of generally vertical second vapor generating tubes arranged in said gas passage and in heat exchange relationship with the combustion gases therein, said second vapor generating tubes being arranged in rows concentric with the combustion chamber and with each other and in communication with both containers, a plurality of generally vertical superheater tubes arranged in five circumferentially spaced superheater banks in said gas passage, an arcuate superheater header arranged above the first superheater bank and communicating with the vapor and liquid container and the upper end of the first superheater bank, a second arcuate superheater header arranged below the first and second superheater banks and in communication with the lower ends thereof, a third arcuate superheater header arranged above and across the second and third superheater banks and in communication with the upper ends of said superheater banks, a fourth arcuate superheater header arranged below the third and fourth superheater banks and in communication with the lower ends of said banks, a fifth arcuate superheater header arranged above the fourth and fifth superheater banks and in communication with the upper ends thereof, and a sixth arcuate superheater header arranged below the fifth superheater bank and in communication with the lower ends of said bank.

References Cited in the file of this patent

UNITED STATES PATENTS

| | | |
|---|---|---|
| 973,468 | Bettington | Oct. 25, 1910 |
| 1,722,496 | Chapman | July 30, 1929 |
| 1,798,830 | Brand | Mar. 31, 1931 |
| 1,917,275 | Rossman et al. | July 11, 1933 |
| 2,009,852 | Lum et al. | July 30, 1935 |
| 2,088,456 | Wood | July 27, 1937 |
| 2,170,145 | Kooistra | Aug. 22, 1939 |

UNITED STATES PATENT OFFICE
CERTIFICATE OF CORRECTION

Patent No. 2,944,532 July 12, 1960

Martin Frisch et al.

It is hereby certified that error appears in the printed specification of the above numbered patent requiring correction and that the said Letters Patent should read as corrected below.

Column 2, line 20, for "a", second occurrence, read -- the --; column 3, line 8, for "wall adjacent gasoutlet" read -- wall, adjacent gas outlet --; line 12, strike out "the", second occurrence; line 15, for "40 41" read -- 40 and 41 --; same column 3, line 19, for "(Fig. 44)" read -- (Fig. 4) --; column 4, lines 9 and 10, strike out "to the combustion air"; line 11, for "spacer" read -- spaces --; column 8, line 17, for "radail" read -- radial --; column 9, line 6, for "not shown)" read -- (not shown) --; column 10, line 19, for "chambers" read -- chamber --; column 11, line 8, for "beng n communcaton" read -- being in communication --; column 14, line 34, for "provde" read -- provide --.

Signed and sealed this 31st day of January 1961.

(SEAL)
Attest:

KARL H. AXLINE
Attesting Officer

ROBERT C. WATSON
Commissioner of Patents